(12) United States Patent
Chen et al.

(10) Patent No.: US 12,498,361 B2
(45) Date of Patent: Dec. 16, 2025

(54) MINIMUM MISCIBLE PRESSURE PREDICTION METHOD FOR $CO_2$-CRUDE OIL SYSTEM CONSIDERING RESERVOIR WELL SPACING

(71) Applicant: CHINA UNIVERSITY OF PETROLEUM (Beijing), Beijing (CN)

(72) Inventors: Hao Chen, Beijing (CN); Xiliang Liu, Beijing (CN); Borui Li, Beijing (CN); Yang Li, Beijing (CN); Weiming Cheng, Beijing (CN); Xiaofeng Tian, Beijing (CN); Xianhong Tan, Beijing (CN); Lijun Zhang, Beijing (CN); Renfeng Yang, Beijing (CN); Mingsheng Zuo, Beijing (CN); Baoxi Yang, Beijing (CN); Ruwei Zhang, Beijing (CN); Zhizhen Lin, Beijing (CN); Qiuting Li, Beijing (CN); Xinyu Qi, Beijing (CN); Feng Luo, Beijing (CN); Linxi Yang, Beijing (CN); Pengbo Li, Beijing (CN); Wen Liu, Beijing (CN)

(73) Assignee: CHINA UNIVERSITY OF PETROLEUM (Beijing), Beijing (CN)

( * ) Notice: Subject to any disclaimer, the term of this patent is extended or adjusted under 35 U.S.C. 154(b) by 0 days.

(21) Appl. No.: 19/066,174

(22) Filed: Feb. 28, 2025

(65) Prior Publication Data
US 2025/0277780 A1 Sep. 4, 2025

(30) Foreign Application Priority Data
Mar. 1, 2024 (CN) .......................... 202410235644.2

(51) Int. Cl.
*G01N 33/28* (2006.01)
*C09K 8/58* (2006.01)
(Continued)

(52) U.S. Cl.
CPC ................. *G01N 33/2823* (2013.01)

(58) Field of Classification Search
CPC ..... G01N 33/2823; G06F 30/20; G06F 30/28; E21B 43/164; E21B 49/00; C09K 8/58
(Continued)

(56) References Cited

FOREIGN PATENT DOCUMENTS

| CN | 110516295 A | * | 11/2019 | ........... E21B 43/164 |
| CN | 114169240 A | * | 3/2022 | ............. G06N 3/045 |

(Continued)

OTHER PUBLICATIONS

English translation of CN 115146556, Oct. 4, 2022. (Year: 2022).*
(Continued)

*Primary Examiner* — Michael P Nghiem

(57) ABSTRACT

A minimum miscible pressure prediction method for a $CO_2$-crude oil system considering reservoir well spacing is provided, including: obtaining characteristic parameters of each component of crude oil; based on the characteristic parameters of each component of the crude oil, obtaining corresponding bubble point or dew point pressures, as well as corresponding oil-gas interfacial tension, oil phase and gas phase densities, and viscosities under different injected gas contents; based on the corresponding bubble point or dew point pressures, as well as the corresponding oil-gas interfacial tension, oil phase and gas phase densities, and viscosities under different injected gas contents, constructing a minimum miscible pressure prediction model for the $CO_2$-crude oil system considering the reservoir well spacing; and based on the minimum miscible pressure prediction model for the $CO_2$-crude oil system considering the reservoir well spacing, obtaining minimum miscible pressure values for the $CO_2$-crude oil system under different reservoir well spacing.

1 Claim, 2 Drawing Sheets

(51) Int. Cl.
*E21B 43/16* (2006.01)
*E21B 49/00* (2006.01)
*G06F 30/20* (2020.01)
*G06F 30/28* (2020.01)

(58) Field of Classification Search
USPC .......................................................... 702/50
See application file for complete search history.

(56) References Cited

FOREIGN PATENT DOCUMENTS

| CN | 115146556 | | 10/2022 | | |
|---|---|---|---|---|---|
| CN | 115822532 | A | 3/2023 | | |
| CN | 118070702 | B * | 9/2024 | | |
| CN | 118627267 | A * | 9/2024 | ............. | G06F 30/28 |

OTHER PUBLICATIONS

English translation of CN 118627267, Sep. 10, 2024., Oct. 4, 2022. (Year: 2024).*

English translation of CN 110516295, Nov. 29, 2019. (Year: 2019).*
English translation of CN 118070702, Sep. 27, 2024. (Year: 2024).*
English translation of CN 114169240, Sep. 17, 2024. (Year: 2024).*
Zou Jiandong, Liao Xinwei, Zhang Ke, Wu Jiaqi , Mu Lingyu, Yuan Zhou Study on minimum miscibility pressure of $CO_2$ flooding at different reservoir pressures Petroleum Geology and Recovery Efficiency, Dec. 25, 2019, Full text, No. 1 Claims involved: 1-6.
Zhang Chen-shuo , Fan Zi-fei , Xu An-zhu , Zhao Lun , Zhao Liang-dong The Influence of Sour Gas on MMP and the Composition Optimization for Solution Gas Reinjection in Volatile Oil R eservoir Science Technology and Engineering, Apr. 18, 2016, Full text, No. 11 Claims involved: 1-6.
Retrieval report-First search dated Jul. 11, 2024 in SIPO application No. 2024102356442.
Notice of first Office action dated Jul. 19, 2024 in SIPO application No. 2024102356442.
Notification to Grant Patent Right for Invention dated Sep. 9, 2024 in SIPO application No. 2024102356442.
Retrieval report-Supplementary search dated Sep. 2, 2024 in SIPO application No. 2024102356442.

* cited by examiner

MINIMUM MISCIBLE PRESSURE PREDICTION METHOD FOR $CO_2$-CRUDE OIL SYSTEM CONSIDERING RESERVOIR WELL SPACING

CROSS-REFERENCE TO RELATED APPLICATIONS

This application claims priority to Chinese Patent Application No. 202410235644.2, filed on Mar. 1, 2024, the contents of which are hereby incorporated by reference.

TECHNICAL FIELD

The present disclosure belongs to the field of oil and gas field development technology, and in particular relates to a minimum miscible pressure (MMP) prediction method for a carbon dioxide ($CO_2$)-crude oil system considering reservoir well spacing.

BACKGROUND

The reservoir development process mainly includes primary, secondary, and tertiary oil recovery. Primary oil recovery relies on the original energy of the reservoir, such as the elastic energy of the reservoir. Secondary oil recovery mainly involves injecting water into the reservoir to supplement the energy of the reservoir, thereby increasing formation pressure and slowing down the decrease in oil production. Currently, reservoirs in China generally enter a "double high" stage high water cut and high recovery. In cases where the recovery effect is poor during the primary oil recovery stage, secondary oil recovery faces challenges such as difficulty in water injection and production after injection due to the inability to achieve water injection development under the actual reservoir conditions. Gases, due to the advantages of small molecular volume and low viscosity, offer superior injection capability and enhanced recovery effects in reservoir development. Particularly, $CO_2$ has a superior development effect because of its miscibility with crude oil under certain temperature and pressure conditions.

According to the relative magnitude of reservoir pressure and the minimum miscible pressure (MMP) of the $CO_2$-crude oil system, $CO_2$ flooding may be classified into miscible flooding, near-miscible flooding, and immiscible flooding. Current research generally finds that the best development effect is achieved when the $CO_2$-crude oil system achieves miscible development, that is, when the reservoir pressure is greater than the MMP. Due to the high cost of $CO_2$ sources in China, increasing the amount of crude oil extracted per unit $CO_2$ injection (oil change rate) has become particularly critical, and the prediction accuracy requirements for MMP have also been improved as a result.

In the prediction of key parameters for $CO_2$ injection in reservoirs, commonly used characterization methods include the slim tube experiment method, empirical formula method, and machine learning method, etc. The slim tube experiment method is the most classic MMP prediction method, but it has a long operation cycle and requires significant human and material resources. The machine learning method is an emerging MMP prediction method in recent years, but its accuracy relies heavily on the selected machine learning model, the volume and accuracy of the data used for modeling. The massive data requirements and the subjective selection of machine learning models often lead to low accuracy in MMP prediction using machine learning methods.

The empirical formula method for predicting the MMP of the $CO_2$-crude oil system is a very practical method, offering advantages such as relatively small data sample requirements, fast calculation speed, simple model construction, and high accuracy. However, the $CO_2$-crude oil system is a multiple-contact miscible process, which heavily depends on the contact time and distance between $CO_2$ and crude oil. Only when $CO_2$ and crude oil have fully completed the contact and component mass transfer may the $CO_2$-crude oil system achieve miscibility. At the scale of the reservoir site, this means that $CO_2$ and crude oil must complete the miscibility process within a certain well spacing range. However, existing empirical formula methods for predicting MMP do not consider the impact of reservoir well spacing on the MMP of the $CO_2$-crude oil system, posing significant challenges for selecting the appropriate pressure in actual reservoir conditions for $CO_2$ injection development.

SUMMARY

To address the above technical problems, the present disclosure proposes a minimum miscible pressure prediction method for a $CO_2$-crude oil system considering reservoir well spacing. By relying on indoor slim tube experiments of different lengths, the method quantifies the impact of different well spacing lengths on the MMP of the $CO_2$-crude oil system based on similarity criteria. On this basis, parameters such as reservoir temperature, reservoir pressure, crude oil composition, dissolved gas composition, and $CO_2$ purity, etc. are considered, providing important basis for the economic and rational design of $CO_2$ injection development plans for reservoirs.

To achieve the above objectives, the present disclosure provides a minimum miscible pressure prediction method for a $CO_2$-crude oil system considering reservoir well spacing, including:

obtaining $CO_2$-crude oil basic data, performing crude oil component splitting and crude oil saturation pressure fitting, and obtaining characteristic parameters of each component of crude oil;

based on the characteristic parameters of each component of the crude oil, conducting multi-stage swelling experiments to obtain corresponding bubble point or dew point pressures, as well as corresponding oil-gas interfacial tension, oil phase and gas phase densities, and viscosities under different injected gas contents;

based on the corresponding bubble point or dew point pressures, as well as the corresponding oil-gas interfacial tension, oil phase and gas phase densities, and viscosities under different injected gas contents, performing minimum miscible pressure prediction for the $CO_2$-crude oil system considering the reservoir well spacing, and constructing a minimum miscible pressure prediction model for the $CO_2$-crude oil system considering the reservoir well spacing; and based on the minimum miscible pressure prediction model for the $CO_2$-crude oil system considering the reservoir well spacing, obtaining minimum miscible pressure values for the $CO_2$-crude oil system under different reservoir well spacing.

According to the minimum miscible pressure prediction method for the $CO_2$-crude oil system considering the reservoir well spacing provided by the present disclosure, the characteristic parameters of each component of the crude oil include a sum of molar contents of methane and nitrogen, a sum of molar contents of ethane to butane, a sum of molar contents of pentane and the ethane, and a sum of molar masses of heptane and crude oil components with higher carbon numbers.

According to the minimum miscible pressure prediction method for the $CO_2$-crude oil system considering the reservoir well spacing provided by the present disclosure, a method for based on the characteristic parameters of each component of the crude oil, conducting the multi-stage swelling experiments to obtain the corresponding bubble point or dew point pressures, as well as the corresponding oil-gas interfacial tension, oil phase and gas phase densities, and viscosities under different injected gas contents includes:

cleaning a model of a slim tube of a preset length, injecting kerosene, and keeping constant to a reservoir temperature and an experimental pressure; displacing the kerosene in the slim tube with formation crude oil at a preset speed until 2 times a rock pore volume is displaced, and then measuring a produced gas-oil ratio and components of a sample at an outlet end of the slim tube; stopping displacement when the components are consistent with a formation crude oil sample; filling an intermediate container with $CO_2$ and keeping constant to the reservoir temperature and the experimental pressure; using an injection pump to displace a gas sample at a constant pressure 0.1 megapascal (MPa) higher than the experimental pressure; ending a displacement experiment after injecting a gas sample with 1.2 times the rock pore volume; during a displacement process, recording a produced oil and gas volume, a pump reading, an experimental pressure, and a back pressure every 0.1 times the rock pore volume injected; gradually increasing the experimental pressure until a recovery rate of the formation crude oil is higher than 90%; and changing a length of the model of the slim tube and repeating above experimental steps to obtain the corresponding bubble point or dew point pressures, as well as the corresponding oil-gas interfacial tension, oil phase and gas phase densities, and viscosities under different injected gas contents.

According to the minimum miscible pressure prediction method for the $CO_2$-crude oil system considering the reservoir well spacing provided by the present disclosure, a method for based on the corresponding bubble point or dew point pressures, as well as the corresponding oil-gas interfacial tension, oil phase and gas phase densities, and viscosities under different injected gas contents, performing the minimum miscible pressure prediction for the $CO_2$-crude oil system considering the reservoir well spacing includes:

inputting the corresponding bubble point or dew point pressures, as well as the corresponding oil-gas interfacial tension, oil phase and gas phase densities, and viscosities under different injected gas contents into data fitting software, and setting different types of data samples;

selecting variable types and formulating a fitting mode based on the different types of data samples;

selecting a fitting estimation method based on a data trend, setting a dependent variable and independent variables, and constructing a fitting model; and based on an iterative method, constructing the minimum miscible pressure prediction model for the carbon dioxide-crude oil system considering the reservoir well spacing for the dependent variable and the independent variables.

According to the minimum miscible pressure prediction method for the $CO_2$-crude oil system considering the reservoir well spacing provided by the present disclosure, the different types of data samples include: the sum of the molar contents of the methane and the nitrogen, the sum of the molar contents of the ethane to the butane, the sum of the molar contents of the pentane and the ethane, the sum of the molar masses of the heptane and the crude oil components with higher carbon numbers, a slim tube experiment temperature, a slim tube length L, and a minimum miscible pressure obtained from a slim tube experiment.

According to the minimum miscible pressure prediction method for the $CO_2$-crude oil system considering the reservoir well spacing provided by the present disclosure, a method for constructing the fitting model is:

$$MMP = (L/Y)^a \times (b + c \cdot T + d \cdot M_{C7+} + e \cdot X_{C1+N2} + f \cdot X_{C2-C4} + g \cdot X_{C5-C6})$$

where Y is a longest slim tube length in the slim tube experiment, L is the slim tube length, T is the slim tube experiment temperature, $M_{C7+}$ is the sum of the molar masses of the heptane and the crude oil components with higher carbon numbers, $X_{C1+N2}$ is the sum of the molar contents of the methane and the nitrogen, $X_{C2-C4}$ is the sum of the molar contents of the ethane to the butane, $X_{C5-C6}$ is the sum of the molar contents of the pentane and the ethane, and a, b, c, d, e, f, g are coefficients to be solved.

The technical effects of the present disclosure are as follows. The present disclosure discloses a minimum miscible pressure prediction method for a $CO_2$-crude oil system considering reservoir well spacing. By obtaining $CO_2$-crude oil basic data, conducting crude oil component splitting and crude oil saturation pressure fitting, the characteristic parameters of each component of the crude oil are obtained. Based on the obtained characteristic parameters of each component of the crude oil, multi-stage swelling experiments are conducted to obtain the corresponding bubble point or dew point pressures, as well as the corresponding oil-gas interfacial tension, oil phase and gas phase densities, and viscosities under different injected gas contents. By plotting the curves of different pressures versus oil-gas interfacial tension, oil-gas density ratio, and oil-gas viscosity ratio, and according to the obtained equivalent pressure values corresponding to the inflection points on the curves of oil-gas interfacial tension, oil-gas density ratio, and oil-gas viscosity ratio under different pressure parameters, the minimum miscible pressure of the $CO_2$-crude oil system is obtained. The obtained minimum miscible pressure of the $CO_2$-crude oil system is used for $CO_2$ flooding reservoir screening to improve oil recovery rate. No existing research considers the impact of reservoir well spacing on the minimum miscible pressure of $CO_2$ flooding. This present disclosure provides an important basis for the economic and rational design of $CO_2$ injection development plans for reservoirs, and supports a deeper understanding of the complex phase behavior and flow characteristics of the $CO_2$-crude oil system within the reservoir.

BRIEF DESCRIPTION OF THE DRAWINGS

The drawings included in the present disclosure are intended to provide a further understanding of the present disclosure and are used to explain the present disclosure. They do not constitute an improper limitation of the present disclosure. In the drawings.

DETAILED DESCRIPTION OF THE EMBODIMENTS

It should be noted that, in the absence of conflict, the embodiments and features in the embodiments of the present disclosure may be combined with each other. The following will describe the present disclosure in detail with reference to the accompanying drawings and embodiments.

It should be noted that the steps shown in the flowchart of the accompanying drawings may be executed in a computer system, such as a set of computer-executable instructions. Moreover, although a logical order is shown in the flowchart, in some cases, the steps shown or described may be executed in an order different from the one described here.

Figure 1:
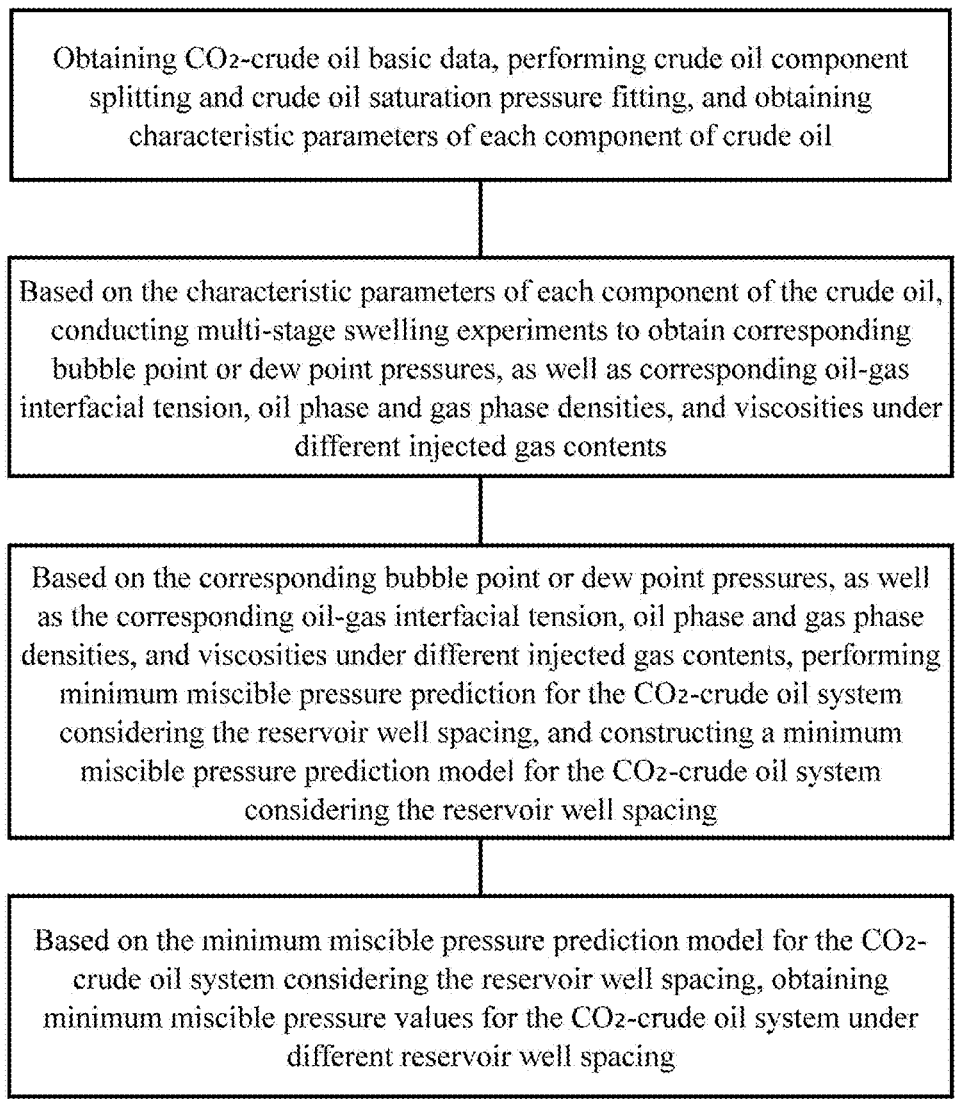
FIG. 1 is a flowchart illustrating a minimum miscible pressure prediction method for a CO$_2$-crude oil system considering reservoir well spacing according to an embodiment of the present disclosure.

As shown in FIG. 1, this embodiment provides a minimum miscible pressure prediction method for a CO$_2$-crude oil system considering reservoir well spacing, including:

obtaining CO$_2$-crude oil basic data, performing crude oil component splitting and crude oil saturation pressure fitting, and obtaining characteristic parameters of each component of the crude oil.

Specifically, the indoor physical simulation methods is used, based on high-temperature and high-pressure pressure-volume-temperature test (PVT) experiments, the fluid components of the formation crude oil are analyzed and obtained. The obtained data includes: ① the sum of the molar contents of methane and nitrogen, denoted as $X_{C1+N2}$, where $X_{C1+N2}$ is 69 molar percent (mol %); ② the sum of the molar contents of ethane to butane, denoted as $X_{C2-C4}$, where $X_{C2-C4}$ is 17 mol %; ③ the sum of the molar contents of pentane and ethane, denoted as $X_{C5-C6}$, where $X_{C5-C6}$ is 0.33 mol %; and ④ the sum of the molar masses of heptane and crude oil components with higher carbon numbers, denoted as $M_{C7+}$, where $M_{C7+}$ is 220.49 grams per mole (g/mol).

Based on the characteristic parameters of each component of the crude oil, multi-stage swelling experiments are conducted to obtain the corresponding bubble point or dew point pressures, as well as corresponding oil-gas interfacial tension, oil phase and gas phase densities, and viscosities under different injected gas contents.

Figure 2:
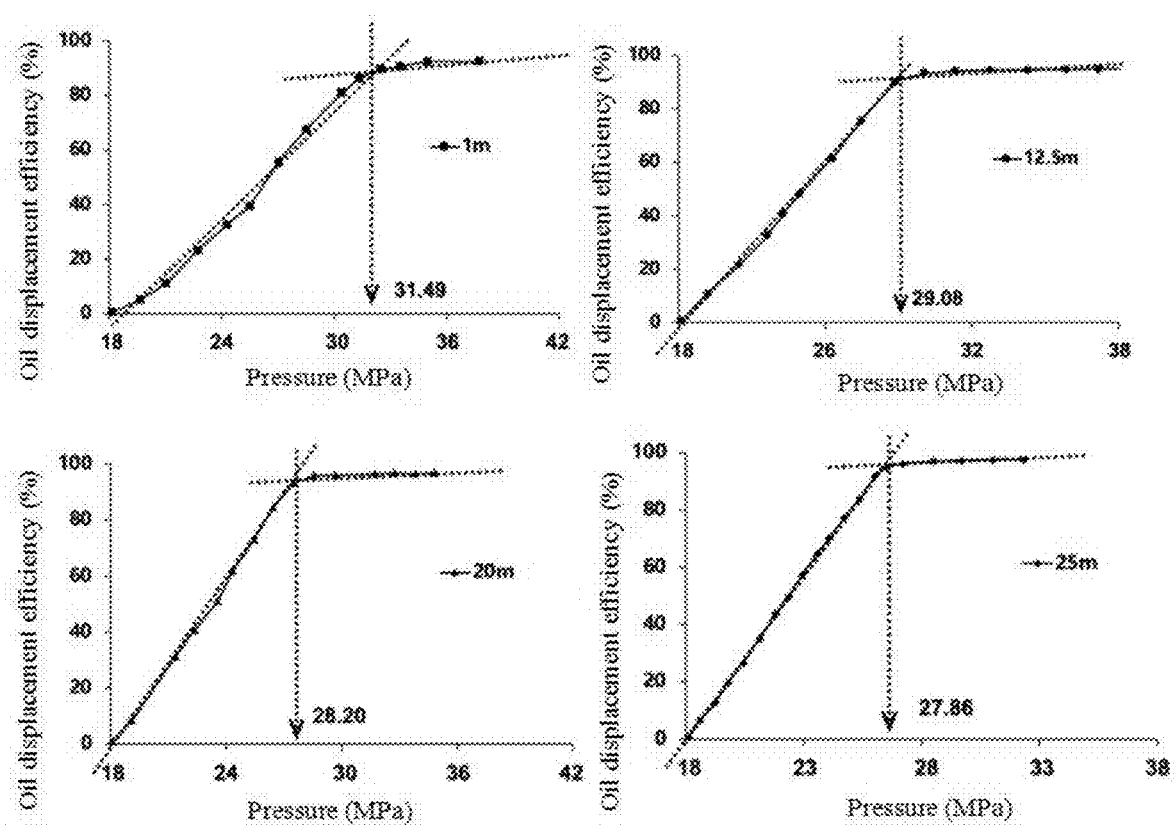
FIG. 2 is a schematic diagram showing minimum miscible pressures for four different slim tube lengths according to an embodiment of the present disclosure.

Specifically, the indoor physical simulation methods is used, a 1 meter (m) long slim tube model is cleaned, injected with kerosene, and kept constant to the reservoir temperature of 127 Celsius degree (° C.) and experimental pressure of 18 MPa. Formation crude oil is used to displace the kerosene in the slim tube at a rate of 0.2 milliliter per minute (ml/min). After displacing to 2 times the rock pore volume, the produced gas-oil ratio and components of the sample are measured at the outlet end of the slim tube. When the components are consistent with the formation crude oil sample, the displacement is stopped. The intermediate container is filled with CO$_2$ and kept constant to the reservoir temperature and experimental pressure of 10 MPa. An injection pump is used to displace the gas sample at a pressure 0.1 MPa higher than the experimental pressure. After injecting a gas sample with 1.2 times the rock pore volume, the displacement experiment is terminated. During the displacement process, for every 0.1 times the rock pore volume injected, the produced oil and gas volume, pump reading, experimental pressure, and back pressure are recorded. Afterwards, the experimental pressure is gradually increased until the experimental pressure reaches 32 MPa, and the recovery rate of the formation crude oil is higher than 90%. Then, the slim tube model lengths are changed to 12.5 meters, 20 meters, and 25 meters respectively, and the above experimental steps are repeated. Based on the experimental results, the minimum miscible pressure maps of carbon dioxide flooding for four different slim tube lengths are plotted as shown in FIG. 2.

Based on the corresponding bubble point or dew point pressures, as well as the corresponding oil-gas interfacial tension, oil phase and gas phase densities, and viscosities under different injected gas contents, the minimum miscible pressure prediction for carbon dioxide-crude oil system considering reservoir well spacing is carried out, and a minimum miscible pressure prediction model for carbon dioxide-crude oil system considering reservoir well spacing is constructed.

Specifically: 1 data organization and import into data fitting software:

the data fitting software SPSS is opened, 7 types of data samples are defined in the variable view as shown in Table 1, which are: ① the sum of the molar contents of methane and nitrogen, $X_{C1+N2}$, unit mol %; ② the sum of the molar contents of ethane to butane, $X_{C2-C4}$, unit mol %; ③ the sum of the molar contents of pentane and ethane, $X_{C5-C6}$, unit mol %; ④ the sum of the molar masses of heptane and crude oil components with higher carbon numbers, $M_{C7+}$, unit g/mol; ⑤ the slim tube experiment temperature, T, unit ° C.; ⑥ slim tube length, L, unit m; and ⑦ the minimum miscible pressure MMP obtained from the slim tube experiment, unit MPa. The variable types of the 7 types of data samples mentioned above are numbers, and the data precision is to retain two decimal places.

TABLE 1

| MMP, MPa | L, m | T, ° C. | $M_{7+}$, g/mol | $X_{C1+N2}$, mol % | $X_{C2-4}$, mol % | $X_{C5-6}$, mol % |
|---|---|---|---|---|---|---|
| 31.49 | 1.00 | 127.00 | 220.49 | 69.00 | 17.00 | 0.33 |
| 29.08 | 12.50 | 127.00 | 220.49 | 69.00 | 17.00 | 0.33 |
| 28.20 | 20.00 | 127.00 | 220.49 | 69.00 | 17.00 | 0.33 |
| 27.86 | 25.00 | 127.00 | 220.49 | 69.00 | 17.00 | 0.33 |

② Selection of Variable Type and Establishment of Fitting Model

After importing the above 7 types of data samples, "the minimum miscible pressure MMP obtained from the slim tube experiment" is defined as the dependent variable, and the other 6 types of data samples are defined as independent variables. During the fitting operation, the "nonlinear regression" mode is selected based on the data trend.

③ Independent Variable Coefficient and Fitting Mode Expression Setting

Based on the data trend, the Levenberg-Marquardt fitting estimation method is selected, and the coefficients for 6 independent variables and 1 constant, totaling 7 parameters, are set as a, b, c, d, e, f, g, respectively. Additionally, the longest slim tube length in the experiment is set to 25. In the fitting model expression, the expected fitting expression is input as follows:

$$MMP = (L/Y)^a \times (b + c \cdot T + d \cdot M_{C7+} + e \cdot X_{C1+N2} + f \cdot X_{C2-C4} + g \cdot X_{C5-C6})$$

where Y is the longest slim tube length in the experiment, L is the slim tube length, T is the slim tube experiment temperature, $M_{C7+}$ is the sum of the molar masses of heptane and crude oil components with higher carbon numbers, $X_{C1+N2}$ is the sum of the molar contents of methane and nitrogen, $X_{C2-C4}$ is the sum of the molar contents of ethane to butane, $X_{C5-C6}$ is the sum of the molar contents of pentane and ethane, and a, b, c, d, e, f, g are coefficients to be solved.

④ Fitting Result Evaluation

Based on the iterative method, the above 7 coefficients are calculated, and the residual sum of squares loss function is defined as the residual sum of squares of the 7 coefficients. After running the iterative method 14 times, the residual sum of squares of the determined coefficients is less than $10^{-8}$, which is considered as an accurate data fitting result. The determined coefficients are a=−0.034, b=4.505, c=0.142, d=0.05, e=−0.02, f=−0.19, g=−0.092. The established minimum miscible pressure prediction method for the $CO_2$-crude oil system considering the reservoir well spacing is as follows:

$$MMP = (L/25)^{-0.034} \times (4.505 + 0.142 \cdot T + 0.05 \cdot M_{C7+} - 0.02 \cdot X_{C1+N2} - 0.19 \cdot X_{C2-C4} - 0.092 \cdot X_{C5-C6})$$

where L is the slim tube length, T is the slim tube experiment temperature, $M_{C7+}$ is the sum of the molar masses of heptane and crude oil components with higher carbon numbers, $X_{C1+N2}$ is the sum of the molar contents of methane and nitrogen, $X_{C2-C4}$ is the sum of the molar contents of ethane to butane, $X_{C5-C6}$ is the sum of the molar contents of pentane and ethane.

Based on the minimum miscible pressure prediction model for the $CO_2$-crude oil system considering the reservoir well spacing, the minimum miscible pressure values of the $CO_2$-crude oil system under different reservoir well spacing are obtained.

Specifically, when the reservoir well spacing is less than 25 meters, the required 6 independent variables and 1 constant, totaling 7 parameters, are substituted into the obtained fitting relationship to calculate the minimum miscible pressure value of the $CO_2$-crude oil system under this well spacing condition.

When the reservoir well spacing is greater than 25 meters, the minimum miscible pressure value of the $CO_2$-crude oil system under this well spacing condition is 27.85 MPa.

This present disclosure discloses a minimum miscible pressure prediction method for a $CO_2$-crude oil system considering reservoir well spacing. By obtaining $CO_2$-crude oil basic data, conducting crude oil component splitting and crude oil saturation pressure fitting, the characteristic parameters of each component of the crude oil are obtained. Based on the obtained characteristic parameters of each component of the crude oil, multi-stage swelling experiments are conducted to obtain the corresponding bubble point or dew point pressures, as well as the corresponding oil-gas interfacial tension, oil phase and gas phase densities, and viscosities under different injected gas contents. By plotting the curves of different pressures versus oil-gas interfacial tension, oil-gas density ratio, and oil-gas viscosity ratio, and according to the obtained equivalent pressure values corresponding to the inflection points on the curves of oil-gas interfacial tension, oil-gas density ratio, and oil-gas viscosity ratio under different pressure parameters, the minimum miscible pressure of the $CO_2$-crude oil system is obtained. The obtained minimum miscible pressure of the $CO_2$-crude oil system is used for $CO_2$ flooding reservoir screening to improve oil recovery rate. No existing research considers the impact of reservoir well spacing on the minimum miscible pressure of $CO_2$ flooding. This present disclosure provides an important basis for the economic and rational design of $CO_2$ injection development plans for reservoirs, and supports a deeper understanding of the complex phase behavior and flow characteristics of the $CO_2$-crude oil system within the reservoir.

The above is only a preferred specific implementation of the present disclosure, but the scope of protection of the present disclosure is not limited to this. Any person skilled in the art may easily think of changes or replacements within the technical scope disclosed in the present disclosure, which should be covered within the scope of protection of the present disclosure. Therefore, the scope of protection of the present disclosure should be determined by the scope of the claims.

What is claimed is:

1. A minimum miscible pressure prediction method for a $CO_2$-crude oil system considering reservoir well spacing, comprising following steps:

obtaining $CO_2$-crude oil basic data, performing crude oil component splitting and crude oil saturation pressure fitting, and obtaining characteristic parameters of each component of crude oil;

based on the characteristic parameters of each component of the crude oil, conducting multi-stage swelling experiments to obtain corresponding bubble point or dew point pressures, as well as corresponding oil-gas interfacial tension, oil phase and gas phase densities, and viscosities under different injected gas contents;

based on the corresponding bubble point or dew point pressures, as well as the corresponding oil-gas interfacial tension, oil phase and gas phase densities, and viscosities under different injected gas contents, performing minimum miscible pressure prediction for the $CO_2$-crude oil system considering the reservoir well spacing, and constructing a minimum miscible pressure prediction model for the $CO_2$-crude oil system considering the reservoir well spacing; and based on the minimum miscible pressure prediction model for the $CO_2$-crude oil system considering the reservoir well spacing, obtaining minimum miscible pressure values for the $CO_2$-crude oil system under different reservoir well spacing;

the characteristic parameters of each component of the crude oil include a sum of molar contents of methane and nitrogen, a sum of molar contents of ethane and butane, a sum of molar contents of pentane and the ethane, and a sum of molar masses of heptane and crude oil components with higher carbon numbers;

wherein a method based on the characteristic parameters of each component of the crude oil, conducting the multi-stage swelling experiments to obtain the corresponding bubble point or dew point pressures, as well as the corresponding oil-gas interfacial tension, oil phase and gas phase densities, and viscosities under different injected gas contents comprises:

cleaning a model of a slim tube of a preset length, injecting kerosene, and keeping constant to a reservoir temperature of 127 Celsius degree and an experimental pressure of 18 MPa; displacing the kerosene in the slim tube with formation crude oil at a speed of 0.2 milliliter per minute until 2 times a rock pore volume is displaced, and then measuring a produced gas-oil ratio and components of a sample at an outlet end of the slim tube; stopping displacement when the components are consistent with a formation crude oil sample; filling an intermediate container with $CO_2$ and keeping constant to the reservoir temperature and the experimental pressure; using an injection pump to displace a gas sample at a constant pressure 0.1 MPa higher than the experimental pressure; ending a displacement experiment after injecting a gas sample with 1.2 times the rock pore volume; during a displacement process, recording a produced oil and gas volume, a pump reading, an experimental pressure, and a back pressure every additional 0.1 times the rock pore volume injected; gradually increasing the experimental pressure until a recovery rate of the formation crude oil is higher than 90%; and changing a length of the model of the slim tube and repeating above experimental steps to obtain the corresponding bubble point or dew point pressures, as well as the corresponding oil-gas interfacial tension, oil phase and gas phase densities, and viscosities under different injected gas contents;

a method based on the corresponding bubble point or dew point pressures, as well as the corresponding oil-gas interfacial tension, oil phase and gas phase densities, and viscosities under different injected gas contents, performing the minimum miscible pressure prediction for the $CO_2$-crude oil system considering the reservoir well spacing comprises:

inputting the corresponding bubble point or dew point pressures, as well as the corresponding oil-gas interfacial tension, oil phase and gas phase densities, and viscosities under different injected gas contents into data fitting software, and setting different types of data samples;

selecting variable types and formulating a fitting mode based on the different types of data samples;

selecting a fitting estimation method based on a data trend, setting a dependent variable and independent variables, and constructing a fitting model; and based on an iterative method, constructing the minimum miscible pressure prediction model for the carbon dioxide-crude oil system considering the reservoir well spacing for the dependent variable and the independent variables;

wherein the different types of data samples comprise: the sum of the molar contents of the methane and the nitrogen, the sum of the molar contents of the ethane and the butane, the sum of the molar contents of the pentane and the ethane, the sum of the molar masses of the heptane and the crude oil components with higher carbon numbers, a slim tube experiment temperature, a slim tube length L, and a minimum miscible pressure obtained from a slim tube experiment;

a method for constructing the fitting model is:

$$MMP = (L/Y)^a \times (b + c \cdot T + d \cdot M_{C7+} + e \cdot X_{C1+N2} + f \cdot X_{C2-C4} + g \cdot X_{C5-C6})$$

wherein Y is a longest slim tube length in the slim tube experiment, L is the slim tube length, T is the slim tube experiment temperature, $M_{C7+}$ is the sum of the molar masses of the heptane and the crude oil components with higher carbon numbers, $X_{C1+N2}$ is the sum of the molar contents of the methane and the nitrogen, $X_{C2-C4}$ is the sum of the molar contents of the ethane and the butane, $X_{C5-C6}$ is the sum of the molar contents of the pentane and the ethane, and a, b, c, d, e, f, g are coefficients to be solved.

\* \* \* \* \*